Feb. 9, 1926.

F. G. DRESSER 1,572,707

DENTAL FLOSS REEL

Filed July 25, 1923

INVENTOR
Frank G. Dresser,
By his attorney,
J. H. McCready.

Patented Feb. 9, 1926.

1,572,707

UNITED STATES PATENT OFFICE.

FRANK G. DRESSER, OF PROVIDENCE, RHODE ISLAND.

DENTAL FLOSS REEL.

Application filed July 25, 1923. Serial No. 653,690.

*To all whom it may concern:*

Be it known that I, FRANK G. DRESSER, a citizen of the United States, residing at Providence, in the county of Providence and State of Rhode Island, have invented certain new and useful Improvements in Dental Floss Reels, of which the following is a specification.

This invention relates to dental floss dispensing devices of the general type in which the supply of dental floss is supported on a reel. The invention is particularly concerned with the construction of reels designed to be used in such dental floss dispensers. It is the chief object of the invention to devise a reel which, while being substantial and serviceable, can be manufactured very economically.

The nature of the invention will be readily understood from the following description when read in connection with the accompanying drawings, and the novel features will be particularly pointed out in the appended claim.

Referring now to the drawings.

The drawings show the invention in connection with the dental floss dispensing device disclosed in my Patent No. 1,454,429, granted May 8, 1923, although the reel devised by this invention may be used in other devices.

The dispensing device shown comprises a casing consisting of two sections indicated at 2 and 3, each section consisting of a circular end piece with a thin annular flange extending from one face thereof. The flanges of the two sections are arranged to telescope, one within the other, and are connected by a bayonet joint so that the casing may readily be opened to permit the removal of an empty reel and its replacement by a full reel. The reel is rotatably mounted within the casing, and the strand of floss unwound therefrom is drawn through a slot in the casing, the desired length being cut off on a knife or cutter 4.

Figure 1:
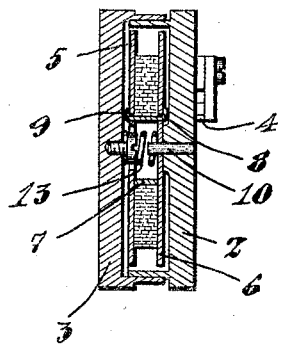
Figure 1 is a transverse cross sectional view of a dental floss dispenser equipped with a reel embodying this invention.
Figure 2:
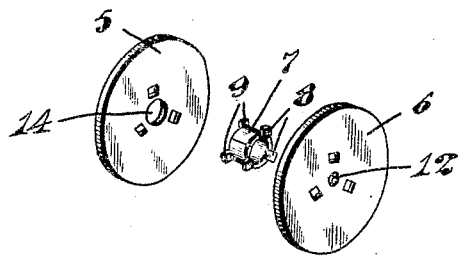
Fig. 2 is a perspective view of the elements of the reel shown in Fig. 1.
Figure 3:
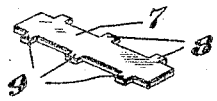
Fig. 3 is a perspective view of the blank from which the hub member of the reel is made.

The reel shown comprises two circular disks 5 and 6, respectively, which are secured together in substantially co-axial parallel relationship to each other by a tubular hub 7. The hub 7 and the disks 5 and 6 preferably are punched out of sheet metal of suitable thickness, the hub being punched out flat, as shown in Fig. 3, and later rolled up into tubular form. Lugs 8 and 9 are formed at the opposite ends of the hub and are entered in holes punched through the disks 5 and 6, the lugs then being turned over so that they secure the hub rigidly to the disks.

In the dispensing device shown, the reel is mounted for rotation on a pin 10 and the disk 6, consequently, has a small hole 12 punched therethrough to receive this pin. A frictional drag is exerted on the reel by a coiled spring 13 which is located in a recess formed in the central portion of the reel and bears against the inner face of the disk 6. For the purpose of admitting the spring a hole 14, considerably larger than the hole 12, is formed in the disk 5, this hole being nearly as large as the internal diameter of the tubular hub.

It will now be evident that this invention provides a reel which can be manufactured very economically, while at the same time being strong and substantial in construction.

While I have herein shown and described the best embodiment of my invention that I have so far devised, it will be appreciated that this embodiment may be modified in various particulars without departing from the spirit or scope of the invention.

Having thus described my invention, what I desire to claim as new is:

A dental floss dispensing reel comprising two circular disks, a tubular hub interposed between said disks and holding them spaced apart, and lugs projecting from the opposite ends of said hub and extending through holes in the disks and securing them to the hub, one of said disks having a small central aperture therein adapted to receive a pivot pin to support the reel for rotation, and the other disk having a central aperture therein nearly as large as the internal diameter of the hub and affording free access to the inner face of the first disk.

FRANK G. DRESSER.